Figure 1:
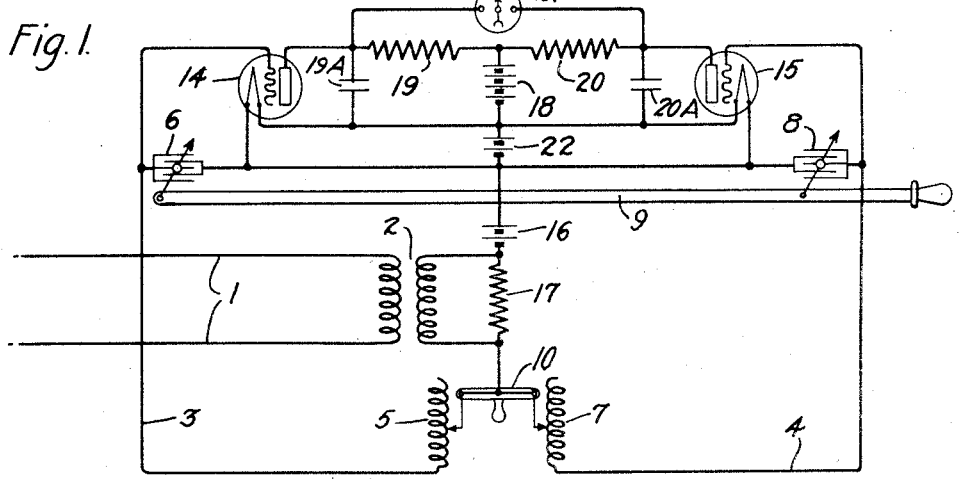

Sept. 28, 1926.

J. W. HORTON

WAVE METER

Filed April 18, 1922

1,601,070

Inventor:
Joseph W. Horton.
by E. V. Griggs
Att'y.

Patented Sept. 28, 1926.

1,601,070

UNITED STATES PATENT OFFICE.

JOSEPH W. HORTON, OF EAST ORANGE, NEW JERSEY, ASSIGNOR TO WESTERN ELECTRIC COMPANY, INCORPORATED, A CORPORATION OF NEW YORK.

WAVE METER.

Application filed April 18, 1922. Serial No. 555,285.

This invention relates to a wave meter, and more particularly to an arrangement whereby the frequency of an alternating current may be accurately determined.

The present invention provides a wave meter which preferably utilizes the point on the characteristic curve at which the slope is steepest or, in other words, at which the rate of change in current amplitude supplied to an indicator with change in frequency is greatest.

According to this invention the current under investigation is supplied by a common coupling to two resonant circuits which are slightly detuned, i. e., the constants of these circuits are slightly different, so that their resonance curves intersect instead of being coincident. These two tuned circuits are connected to balanced rectifying devices so that the potential of one circuit is impressed upon the input circuit of one device, while the potential of the other circuit is supplied to the input circuit of the second device, and an indicating instrument is connected across the serially but oppositely connected output circuits of both devices.

In a balanced system having devices of like operating characteristics and the impedances of which are identical for equal voltages, equal currents will flow through the plate circuits under normal conditions, and hence with an indicator connected as described above, there will be no deflection recorded therein.

However, if an alternating current is supplied simultaneously to the two resonant circuits which are so designed that their characteristic curves have the same amplitude but which resonate at slightly different frequencies, currents of different amplitudes will flow through them except at one particular frequency and different potentials will be impressed upon the control elements of the devices. Under these conditions, the amplitude of the currents flowing through the respective plate circuits will be unequal. The indicator being connected across the plate circuits of both devices, currents flowing therethrough will act differentially upon it, and the deflection recorded, if rectifying devices having identical characteristic curves and the same impedances at equal voltages are used, will be proportional to the difference in the amplitudes of the currents flowing in the plate circuits of the devices, which, as is well known, is proportional to the difference of the potentials impressed upon their control elements by the separate tuned circuits.

As the resonance points of the tuned circuits, slightly differing from one another, are shifted by simultaneously varying the inductance or capacity included in these circuits, a point will be reached at which there will be no deflection recorded by the indicator. At this point, due to the fact that the characteristic curves of the tuned circuits intersect, equal potentials will be impressed upon the control elements of the tubes, and as a result the amplitude of the differentially acting currents will be the same. By supplying the meter circuits with current from sources of known frequencies and recording the settings of these circuits in each case the apparatus may be calibrated. The frequency of a current supplied to the meter circuits may thereafter be read directly from the record thus obtained.

The primary object of this invention is to provide a very sensitive meter for accurately indicating the frequency of the current under investigation. Another object is to provide a frequency meter in which no deflection is produced in an indicating apparatus when the resonant circuit system is adjusted to the frequency of the current. Still another object is to provide a meter in which a single setting serves to indicate the frequency of the external source.

Figure 2:
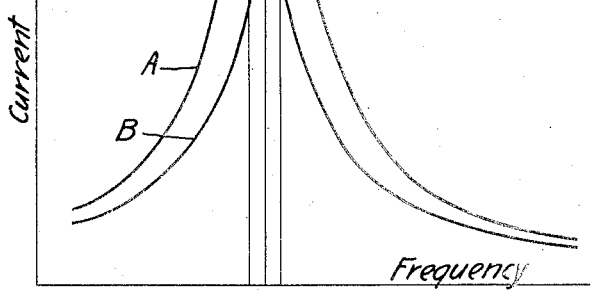
Figure 3:
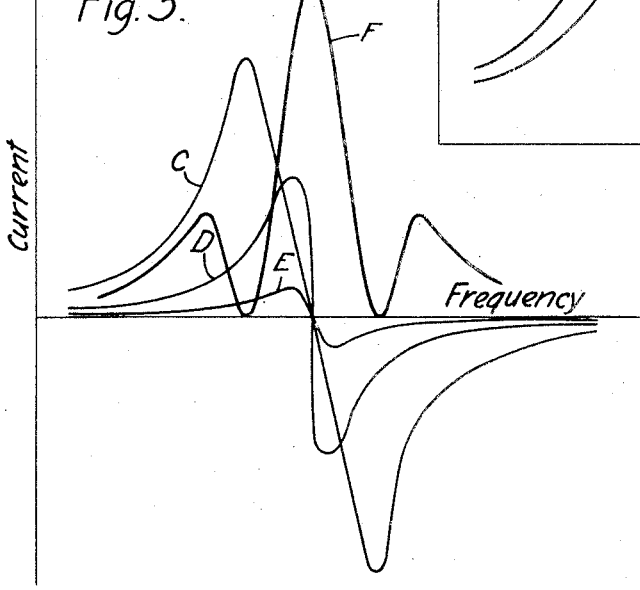

An understanding of the invention and the method of operation of its various parts may be had from the following description taken in conjunction with the attached drawings in which Fig. 1 shows the circuit arrangement of a meter in accordance with this invention, Fig. 2 shows the characteristic curves of the tuned input circuits of the meter, and Fig. 3 shows the resultant curves obtained for various amounts of detuning of the resonant circuits.

Referring to Fig. 1, the alternating current to be investigated is supplied by the circuit 1 through a transformer or repeating coil 2 to two tuned circuits 3 and 4. The secondary of the transformer 2 is included in a common connection for these circuits. One tuned circuit comprises, besides the secondary of the transformer 2 and the resistance 17 which is included in both tuned circuits, an inductance 5 and a capacity 6, while the other tuned circuit includes an inductance 7 and capacity 8 as well as the transformer secondary and the resistance 17. These circuits should be slightly detuned, that is, tuned to slightly different frequencies. Any well-known method of securing this condition may be employed. For instance, the coils may have different inductance values and the condensers equal capacity values; whereby the potential drops across the condensers 6 and 8 which are respectively impressed upon the control elements of the device 14 and 15 will be proportional to current flowing in the respective tuned circuits. In case the potentials impressed upon the control elements of the devices 14 and 15 are derived from the inductances of the tuned circuits, the inductances should be equal and the capacity values different.

A common driving means is provided for changing the constants of the tuned circuits 3 and 4. As shown, this driving means may comprise a rod or bar 9 secured to the movable plates of the variable condensers 6 and 8. By adjusting the position of the movable plates relatively to the associated fixed plates of these condensers, the values of the capacities included in the two circuits may be varied. Obviously, the same result may be obtained by providing a driving means 10 connected to adjustable contacts associated with the inductance coils 5 and 7. When either of these arrangements is used, the periodicities of both the circuits will be varied and by connecting the driving means 9 or 10 with the adjustable element or elements of both circuits so that the electrical constants of these elements are simultaneously increased or decreased by equal increments, their resonance points will be shifted, but always in fixed relation to each other.

Associated with the circuits 3 and 4 is a balanced system comprising two electric discharge rectifiers having a battery 16 connected between their control elements or grids and cathodes through a resistance 17, whereby equal potentials will be impressed upon the grid elements and the current flow in their plate circuits due to a common plate source 18 will be equal. Preferably the potential of source 16 will be of proper value to reduce the plate current of both devices to zero. Under these conditions current will flow in the plate circuits of the devices 14 and 15 only when the potentials impressed upon their control elements are opposed to that supplied by the source 16.

The plate circuits of the devices are connected to a source 18 through resistances 19 and 20, which are equal in magnitude, and a direct current indicating device 21 having a mid zero point is connected to the outer terminals of resistances 19 and 20. Condensers 19$^A$ and 20$^A$ provide low impedance paths for the alternating current flowing in the plate circuits of the devices 14 and 15. A source of current, as for instance, a battery 22, supplies heating current to the filaments of both devices. The input circuit of the device 14 is coupled to the circuit 3 my the condenser 6, and similarly the condenser 8 of the other tuned circuit serves to couple the circuit 4 to the input circuit of the device 15.

If now an alternating current is supplied to the primary circuit of the transformer 2, a difference of potential, fluctuating at the frequency of the source 1, will occur at the terminals of the resistance 17 and electric waves of this frequency will be produced in the circuits 3 and 4. Differences of potential will exist across the condensers 6 and 8 and will be impressed upon the grid elements of the rectifiers 14 and 15.

Since the circuits are tuned to different frequencies, the current supplied to them by the transformer 2 will be attenuated by different amounts, the potential drop across the condenser 6 will differ from that across the condenser 8, and hence the potentials thereby impressed upon the grids of 14 and 15 respectively will be different. As described above, whenever these potentials oppose that supplied by the source 16, currents will flow through the plate circuits of the devices 14 and 15 which, as is well known, will be proportional to the effective potentials impressed upon their grids. As these potentials are different, the amplitude of the currents flowing in the respective plate circuits and the potential drops across the equal resistances 19 and 20 will be unequal. These potentials being oppositely directed relative to the indicator 21, there will be a resultant current flow in one direction or the other and a deflection equal to their difference either to the right or left of zero will be recorded by the indicator.

The curves shown in Fig. 2 are characteristic curves of the resonant circuits 3 and 4 in which the ordinates represent current values and the abscissæ represent frequencies. Curves A and B are referable to the tuned circuits 3 and 4 considered separately. They, therefore, represent intensity of currents flowing through them, for different frequencies which would be effective in deflecting the indicator 21, if the indicator were associated with each of these circuits independently of the other. With the indicator connected across the resistance 19, maximum deflection will be had when the resonance point of the circuit 3 is set at the frequency indicated by the point 23 on curve A, and, since, at that frequency, the potential drop across the resistance 19 is a maximum, the deflection recorded by the indicator will be a maximum. Similarly, when the indicator is associated with the circuit 4 through the device 15, maximum current will flow through the resistance 20, the potential drop across the resistance and obviously the deflection of the indicator 21 will be a maximum at a frequency corresponding to the point 24 on the curve B.

However, with the indicator connected across both tuned circuits 3 and 4 as described, the value of the deflecting potential which is supplied to the indicator will be the difference of the drop of potentials across the resistances 19 and 20 included in the plate circuits of the devices 14 and 15. Therefore, at points 23 and 24, a deflection will be recorded, whereas at the point 25 where the curves A and B intersect, the needle of the indicator will stand at zero.

The curves C, D and E shown in Fig. 3 represent the resultant currents supplied to the indicator 21 for three different settings of the resonance points of the circuits 3 and 4 relatively to the frequency of the source 1 when the frequency of the source is varied over a similar range in each case, the current amplitudes being plotted against frequencies. It is to be noted that the slope of these curves is greatest at the point where they pass through zero. It has been observed that the rate of change of current at the zero point and hence deflection of the indicator 21 is five or six times greater than the maximum rate of change of current for either circuit 3 or 4 used above.

Curve F represents the rate of change of the resultant current flowing through the resistances 19 and 20 and therefore the rate of change of the effective potential impressed upon the indicator 21 as the frequency of the source 1 is varied over a range similar to that referred to above and corresponds to curve C. This being true of each of the curves C, D and E, it will be apparent that any setting of the resonance points of the circuits 3 and 4 relatively to the frequency of the source 1, within reasonable limits, may be used. However, in order to secure maximum sensitivity of the apparatus, the circuits 3 and 4 should be tuned as close as is practically possible to the frequency of the wave under investigation.

Obviously then, the rate of change of amplitude of the resultant current flowing in the combined plate circuits of the devices 14 and 15 is a maximum and the effective potential supplied to the indicator is zero at one point only. This arrangement therefore provides a single point indicating one frequency value which is sharply defined.

The input circuits of the devices are shown connected across the capacity elements of the resonance circuits, but of course, these circuits may be associated with one another through the inductance elements either by direct connection or inductively.

While for a complete and clear disclosure of the invention, certain elements, circuit arrangement and specific details have been described, it is to be understood that this invention is not limited thereto, but only by the scope of the appended claims.

What is claimed is:

1. The method of using a device, including a plurality of resonant devices, an indicator and a source for supplying differentially acting currents to said indicator, to determine the frequency of an electric wave which comprises supplying the wave to the resonant circuits to produce different currents, and using said different currents to control the effective current supplied to the indicator.

2. The method of operating a meter, including an indicator and a source supplying differentially acting currents thereto, to determine the frequency of a wave which comprises subjecting the wave to different degrees of attenuation to produce other waves, controlling the supply of differentially acting currents by said other waves, and varying the different attenuations until they are equal.

3. The method of operating a device, including a plurality of resonant circuits, an indicator and a source for supplying differentially acting currents to said indicator, for determining the frequency of an electric wave which comprises supplying the electric wave to the resonant circuits to produce different current waves therein, causing said current waves to control the differentially acting currents and using the resultant current to control an indication.

4. The method of operating a device, including a plurality of resonant circuits, an indicator, and a source for supplying differentially acting currents to said indicator; for determining the frequency of an electric wave which comprises impressing said wave upon the resonant circuits to produce different current waves, using said current waves to control the flow of differentially acting currents, and controlling an indication by said differentially acting currents.

5. A wave meter comprising resonant means for attenuating an electric current supplied thereto by different amounts, an indicator, a source for supplying differentially-acting voltages to said indicator, and means controlled by said attenuating means for controlling the supply of differentially acting voltages to said indicator.

6. A wave meter comprising resonant means for attenuating the current supplied thereto by different amounts, an indicator, a source supplying oppositely directed currents to said indicator, means controlled by said attenuating means for controlling the effective current supplied to said indicator.

7. A wave meter comprising a plurality cf resonant circuits, an indicator, a source supplying differentially acting voltages to said indicator and means controlled by said circuits for controlling the effective voltage applied to said indicator.

8. A device for indicating a characteristic of an electric wave comprising a plurality of circuits tuned to different frequencies having a common portion, means for supplying a wave to said common portion, an indicator, a source supplying differentially acting voltages to said indicator, and means controlled by said circuits for controlling the differentially-acting voltages applied to said indicator.

9. A device for indicating a characteristic of an electric wave comprising a plurality of circuits tuned to different frequencies having a common portion, means for supplying a wave to said common portion, an indicator, a source supplying differentially acting currents to said indicator, a balanced system controlled by said tuned circuits for controlling the effective current supplied to said indicator.

10. A device for indicating a characteristic of an electric wave comprising a plurality of circuits tuned to different frequencies having a common portion, means for supplying a wave to said common portion, an indicator, a source supplying differentially acting voltages to said indicator, and a balanced system controlled by the current flowing in said tuned circuits for controlling the differentially-acting voltages applied to said indicator.

11. A device for indicating a characteristic of an electric wave comprising a plurality of circuits tuned to different frequencies having a common portion, means for supplying a wave to said common portion, an indicator, and a source supplying differentially acting currents to said indicator, and a balanced system including electric discharge devices controlled by said circuits, for controlling the differential currents supplied to said indicator.

12. A device for indicating a characteristic of an electric wave comprising a plurality of circuits tuned to different frequencies having a common portion, means for supplying a wave to said common portion, a balanced system including electric discharge devices having input and output circuits, the input circuit of each device including one of said tuned circuits, the output circuit of said devices being connected to oppose each other, and an indicator associated with said output circuits.

13. A plurality of electric discharge devies having output circuits and differently tuned input circuits, a current-responsive device connected in opposite manner with said output circuits to respond to the difference between the currents therein, and means for supplying an alternating electromotive force simultaneously to said input circuits.

14. A frequency meter comprising a source supplying differentially acting currents to an indicator, means for supplying the wave to be investigated to circuits adapted to produce other waves, and means controlled by said other waves to determine the effective current supplied to said indicator.

15. A frequency meter comprising an indicator, a source supplying differentially acting currents to said indicator, circuits having a common portion, means for impressing a wave upon said common portion to produce other waves, and means controlled by said other waves to determine the effective current supplied to said indicator.

In witness whereof, I hereunto subscribe my name this 17th day of April, A. D., 1922.

JOSEPH W. HORTON.